United States Patent
Murray et al.

(10) Patent No.: US 10,782,053 B1
(45) Date of Patent: Sep. 22, 2020

(54) SINGLE STAGE, SINGLE PHASE, LOW PRESSURE REFRIGERATION SYSTEM

(71) Applicant: OTG, LLC., Prairie Village, KS (US)

(72) Inventors: John Murray, Denison, TX (US); Jon Saferstein, Shawnee, KS (US)

(73) Assignee: OTG, LLC, Prairie Village, KS (US)

( * ) Notice: Subject to any disclaimer, the term of this patent is extended or adjusted under 35 U.S.C. 154(b) by 0 days.

(21) Appl. No.: 16/408,306

(22) Filed: May 9, 2019

Related U.S. Application Data (60) Provisional application No. 62/669,164, filed on May 9, 2018.

(51) Int. Cl.

| F25B 23/00 | (2006.01) |
|---|---|
| F28D 1/047 | (2006.01) |
| F25B 41/04 | (2006.01) |
| F25B 41/00 | (2006.01) |
| F28D 20/00 | (2006.01) |

(52) U.S. Cl.
CPC ............ *F25B 23/00* (2013.01); *F25B 41/003* (2013.01); *F25B 41/04* (2013.01); *F28D 1/0472* (2013.01); *F28D 20/0034* (2013.01)

(58) Field of Classification Search
CPC .... F28D 1/0472; F28D 20/0034; F25B 23/00; F25B 41/003
USPC .......................................................... 62/467
See application file for complete search history.

(56) References Cited

U.S. PATENT DOCUMENTS

| 3,226,949 A | 1/1966 | Gamache |
| 3,248,895 A | 5/1966 | Mauer |
| 3,370,438 A | 2/1968 | Hopkinson |
| 3,427,819 A | 2/1969 | Seghetti |
| 3,577,742 A | 5/1971 | Kocher |
| 3,580,006 A | 5/1971 | Quick |
| 3,719,057 A | 3/1973 | Grant |
| 4,947,655 A | 8/1990 | Shaw |
| 4,951,475 A | 8/1990 | Alsenz |
| 5,586,445 A | 12/1996 | Bessler |
| 9,677,817 B1* | 6/2017 | Dudis ..................... F28D 15/00 |
| 2005/0274670 A1* | 12/2005 | Perriello ................... B09C 1/00 210/610 |
| 2007/0268668 A1 | 11/2007 | Lin et al. |

(Continued)

OTHER PUBLICATIONS https://en.wikipedis.org/wiki/Refrigeration.

*Primary Examiner* — Ana M Vazquez
(74) *Attorney, Agent, or Firm* — Erickson Kernell IP, LLC; Kent R. Erickson (57) ABSTRACT

A fluid chiller includes a tubular coil enclosed within a vacuum housing which is partially filled with a coolant and an atmosphere with the vacuum housing connected to a vacuum source. A valve selectively connects the vacuum source to the vacuum housing to allow selective reduction of the pressure within the vacuum housing to obtain a reduction of temperature of the coolant therein. A conventional, compressor type refrigeration system may be connected to the vacuum housing for chilling the vacuum housing and the atmosphere and coolant therein to an initial temperature, prior to applying a vacuum to the vacuum housing for further temperature reduction. A fluid, which may be a secondary coolant, flows through the tubular coil at least partially immersed in the coolant to cool the secondary coolant. The secondary coolant is used to cool a heat load.

22 Claims, 9 Drawing Sheets

(56) References Cited

U.S. PATENT DOCUMENTS

| | | |
|---|---|---|
| 2009/0077992 A1* | 3/2009 | Anderson ................ B01D 1/02 62/291 |
| 2009/0211202 A1 | 8/2009 | Lemme |
| 2014/0034655 A1 | 2/2014 | Wooldridge et al. |
| 2015/0157030 A1 | 6/2015 | Giger et al. |
| 2016/0159553 A1 | 6/2016 | Wooldridge et al. |
| 2016/0299443 A1 | 10/2016 | Anderl et al. |

* cited by examiner

SINGLE STAGE, SINGLE PHASE, LOW PRESSURE REFRIGERATION SYSTEM

CROSS-REFERENCES TO RELATED APPLICATION

This application claims the benefit of U.S. Provisional Application Ser. No. 62/669,164, filed May 9, 2018 and entitled "Single Stage, Single Phase Low Pressure Refrigeration System," which is incorporated herein by this reference.

BACKGROUND OF THE INVENTION

Field of the Invention

The invention relates generally to the field of refrigeration and in particular, to a single phase low pressure refrigeration system that incorporates a thermo-vessel-coil within a vacuum enclosure.

Background Art

Because of cost, environmental issues, and inherent inefficiencies of present compression phase refrigeration systems, it is highly desirable that a new single phase refrigeration system that operates with less environmental concerns and maximum energy efficiencies, for both commercial and residential buildings, be created. Commercial and residential buildings require refrigeration of the air inside the building during at least part of the day, in both summer and winter periods, even in climates where winter temperatures are relatively low. This is due both to solar insolation on the building and the internal heat load generated by lighting, equipment and personnel.

Prior art refrigeration systems typically operate on a vapor-compression cycle and include, in series, an evaporator, a compressor, a condenser and an expansion valve. In these systems, a circulating refrigerant enters the compressor as a vapor. The vapor refrigerant is compressed and exits the compressor still as a vapor, but at a higher temperature and pressure, while still below the vapor pressure at the exit temperature. The vapor refrigerant travels through the condenser which cools the vapor, condensing the vapor into a liquid by removing additional heat at constant pressure and temperature. Thereafter, the liquid refrigerant goes through the expansion valve where its pressure abruptly decreases, causing flash evaporation cooling of a portion of the refrigerant converting the refrigerant to a liquid-vapor mixture.

The flash evaporation at the expansion valve results in a mixture of liquid and vapor at a lower temperature and pressure than at the entrance to the expansion valve. The cold, liquid-vapor refrigerant then travels through the evaporator where the remaining liquid is vaporized by heat absorption of the warm air from the room being cooled, i.e. air at the temperature of the room is blown by a fan across the evaporator, which is typically an assembly of tubes and fins. The resulting vapor refrigerant returns to the compressor inlet to repeat the thermodynamic cycle.

The efficiencies of operating a refrigeration system could be substantially increased if an system was created with sufficient cooling capacity that would eliminate the need for a phase changing fluid.

SUMMARY OF THE INVENTION

The present invention meets a long-felt need in the art by providing a new refrigeration or cooling system which utilizes a thermo-vessel-coil enclosed within a chiller with a coolant solution within said enclosure. The thermo-vessel-coil enclosed within the chiller, has sufficient thermal capacity so as to eliminate the need for compression, expansion, and phase changing coolant, such as Freon gas.

The single phase, low pressure refrigeration system of the present invention comprises a closed loop fluid circuit, which includes a thermo-vessel-coil, a coolant pump, a fan, an ev-coil, a coolant regulator valve, and a coolant bypass valve. In one mode of operation, chilled coolant flows from the thermo-vessel-coil (enclosed within the chiller) through the coolant pump and into the ev-coil within the space to be cooled. After passing through the ev-coil, heat saturated coolant is returned to the thermo-vessel-coil within the chiller. In another mode of operation, the bypass valve is responsive to a bypass temperature signal controlled or set by a thermostat control unit. If the temperature of the heat saturated coolant returning from the ev-coil is below the temperature established by the thermostat, the bypass valve directs the coolant to return to the pump, bypassing the thermo-vessel-coil.

The thermo-vessel-coil of the system is housed within an insulated chiller. The chiller is partially filled with a bath of coolant in which the thermo-vessel-coil is submerged. The bath of coolant in the chiller is separate from and does not intermix with the coolant in the fluid circuit. A vacuum supply circuit comprised of a vacuum reservoir (a deep vacuum reservoir), a vacuum pump, a moisture separator and a vacuum regulator valve, is used to keep the chiller in deep vacuum and devoid of heat, which in turn keeps the bath of coolant and the inside temperature of the chiller at a desired temperature, which in turn keeps the coolant in the thermo-vessel-coil at a desired temperature. The chiller is initially cooled upon startup only by use of a conventional refrigeration system or other electronic means. Upon the coolant in the chiller being chilled to a predetermined starting temperature, vacuum is applied to the chiller and regulated to maintain the temperature of the coolant bath in the chiller. Thereafter, no further operation of the conventional cooling system is necessary under normal load conditions.

The single phase, low pressure refrigeration system of the present invention also features the ability to use new ev-coil designs. Since the system is no longer under extreme pressures to absorb heat and compress gas, and since the system is running only in a single phase, liquid, there is an ability to create new ev-coil designs which far exceed the efficiencies of present evaporator specifications.

Glycol based coolants are suitable for use within the single phase, low pressure refrigeration system of the present invention. Lubrication, anti-wear or anti-corrosion agents may be added to the coolant.

The above and other advantages of the single phase, low pressure refrigeration system of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

The exemplary embodiment of the present invention is described in terms of use as a single stage, single phase low pressure refrigeration system. However, the apparatus described herein may also be used to implement many different types of cooling, air conditioning, or freezer systems in both residential or commercial applications. (All temperatures referenced in this disclosure are in degrees Fahrenheit. All pressures referenced in this disclosure are in Torr.)

Figure 1:
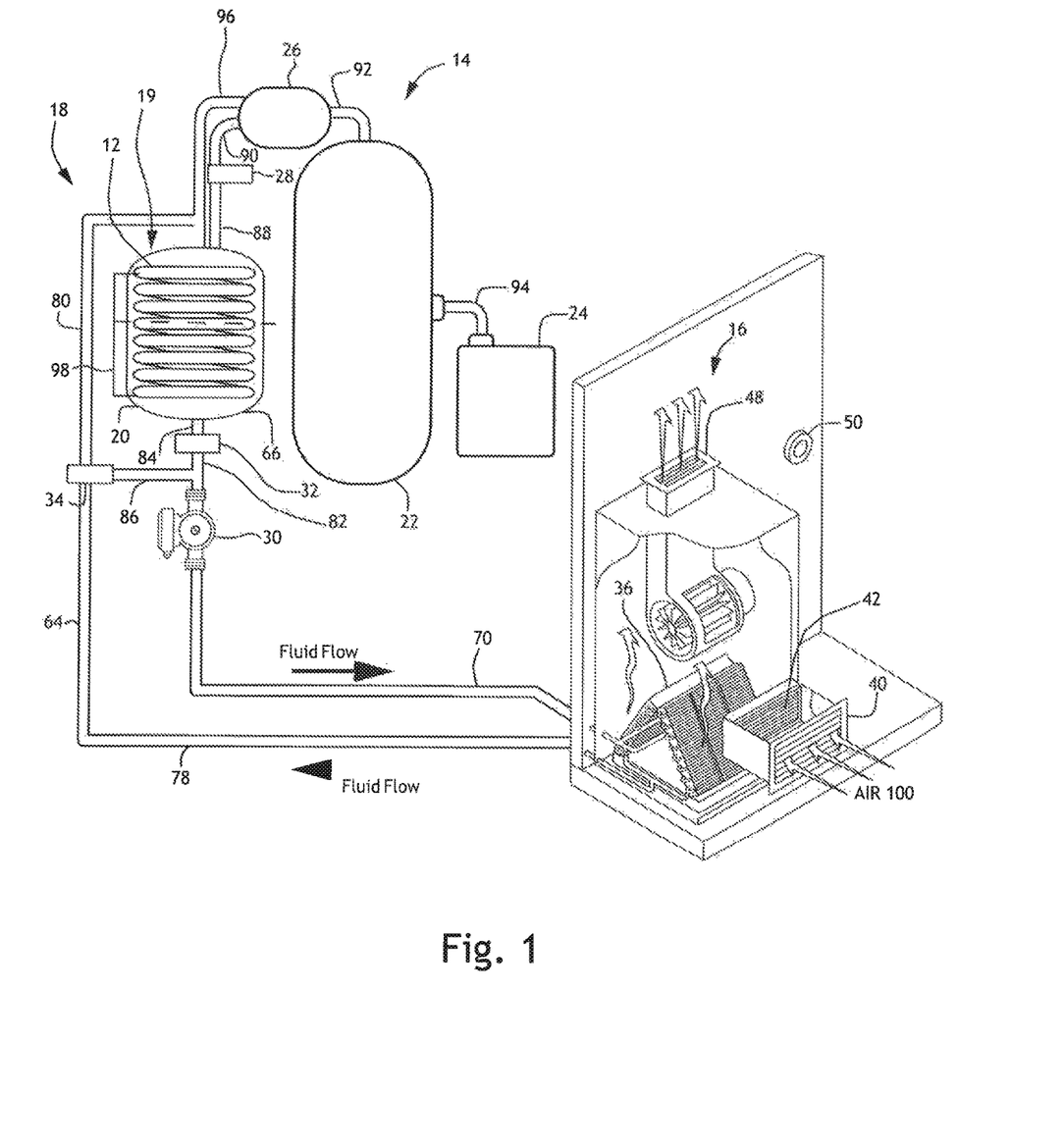
FIG. 1 is a schematic representation of the single phase, low pressure refrigeration system of the present invention.

Reference is now made to FIG. 1, which schematically illustrates the single phase, low pressure refrigeration system 10 of the present invention. The system includes a fluid circuit 18 circulating a first coolant 64, a vacuum system assembly 14, and a vacuum pump 24, and a chiller assembly 19 which encases a thermo-vessel-coil assembly 12.

Figure 2:
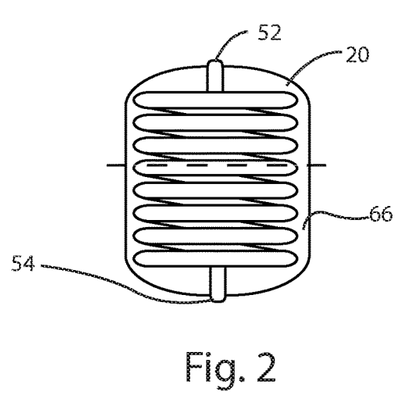
FIG. 2 is a schematic representation of a vacuum housing and thermo-vessel-coil which form part of a chiller assembly of the single phase, low pressure refrigeration system of the present invention.
Figure 3:
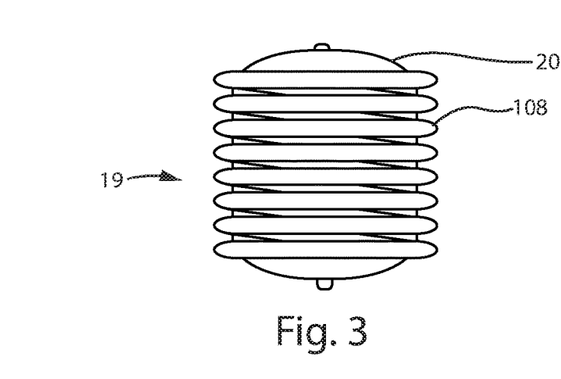
FIG. 3 is a schematic representation of a vacuum housing and thermo-vessel-coil with the addition of pre-cooling coils about the exterior of the vacuum housing.
Figure 4:
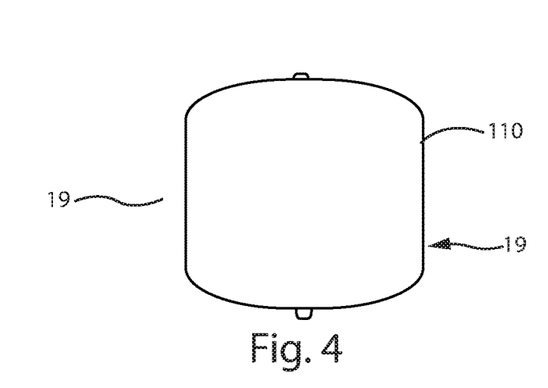
FIG. 4 is a schematic representation the assembly of FIG. 3 with the further addition of insulation about the exterior of the vacuum housing and pre-cooling coils, and which form the completed chiller assembly.

With reference to FIGS. 2-4, the chiller assembly 19 includes a thermo-vessel-coil 12 (a tubular coil) housed within a vacuum housing 20. The vacuum housing 20 is fabricated from stainless steel and is shown schematically as a tank. The thermo-vessel-coil has a coolant inlet 52 and a coolant outlet 54, which protrude from the vacuum housing 20. The vacuum housing 20 is designed to be partially filled with a second coolant 66 and the thermo-vessel-coil 12 is submerged in the second coolant 66. In the exemplary embodiment, the vacuum housing 20 is filled approximately half full with the second coolant 66. Other coolant levels may prove practical and desirable depending upon specific applications and further product development.

With reference to FIGS. 1 and 3, a conventional refrigeration system 98 is required to initially create a state of deep vacuum for the chiller assembly 19 and allow the second coolant 66 to reach its initial operating temperature. The refrigeration system 98 may also be required during periods of high heat loads. In the exemplary embodiment, the refrigeration system 98 is a Freon/compressor based system and cooling coils 108 are wrapped around the exterior of the vacuum housing 20. The refrigeration system 98 is not limited to a Freon/compressor based system. Other types of refrigeration systems are known in the art and may be adapted for use with the cooling system 10 of the present invention. FIG. 4 shows a completed chiller assembly 19, where the vacuum housing 20 has been encased in insulation 110.

System Configuration

In more detail, the fluid circuit 18, comprises the thermo-vessel-coil 12 of the chiller assembly 19, a regulator valve 32, a coolant pump 30, an ev-coil 36, and a bypass valve 34. The outlet of the thermo-vessel-coil 12 is connected to an inlet of the regulator valve 32 via a coolant supply line 84. An outlet of the regulator valve 32 is connected to an inlet 60 of the coolant pump 30 via coolant supply line 82. The regulator valve 32 controls the volume of the first coolant 64 flowing to the coolant pump 30 and prevents backflow of the first coolant 64 into the thermo-vessel-coil 12. The coolant pump 30 has an outlet which is connected to an inlet of the ev-coil 36 via a coolant supply line 70.

The ev-coil 36 has an outlet which is connected to an inlet of the bypass valve 34 via a coolant return line 78. An outlet of the bypass valve 34 is connected to the inlet of the thermo-vessel-coil 12 via coolant return line 80. Interconnecting the bypass valve 34 with the coolant supply lines 82 and 84 is a bypass line 86.

The vacuum housing 20 is connected to the regulator valve 28 via a vacuum supply line 88. The regulator valve 28 is connected to the moisture separator 26 via vacuum supply line 90. The moisture separator 26 is connected to the vacuum reservoir 22 via a vacuum supply line 92. The vacuum reservoir 22 is connected to the vacuum pump via a vacuum supply line 94. The moisture separator 26 includes a moisture return line 96 which returns moisture to the vacuum housing 20. The vacuum housing 20 is partially filled with the second coolant 66.

Operation of the System

As referenced above, the vacuum housing 20 is partially filled with the second coolant 66. Therefore, the thermo-vessel-coil 12 is partially immersed at all times in the second coolant 66. Experimentation has shown that filling the vacuum housing 20 approximately half full with the second coolant 66 provides good system operating characteristics. It should be noted that the thermo-vessel-coil 12, pump 30, ev-coil 36, the regulator valve 32, bypass valve 34 and interconnecting coolant lines form a closed loop system and therefore, the first coolant 64 circulating within the fluid circuit 18 does not intermix with the second coolant 66 contained within the vacuum housing 20.

The vacuum housing 20 is equipped with the refrigeration system 98, which may be a conventional compressor/Freon based system. In one implementation of the refrigeration system 98, the cooling coils of a compressor/Freon based system may be embedded within insulation surrounding the vacuum housing 20. The refrigeration system 98 is used only at startup or during periods of high heat load of the cooling system 10 of the present invention. For the cooling system 10 to operate most efficiently, it is necessary to first initially chill the vacuum housing contents, i.e. air & second coolant 66, to an initial temperature within the range of about 35 to 50 degrees Fahrenheit to condense the internal air molecules so the vacuum performance is increased allowing the system to achieve deep vacuum into the millitorr range. Once the second coolant 66 in the vacuum housing 20 has been chilled, vacuum within the range of about 0-10 millitorr is applied to the vacuum housing 20. It is expected that the application of vacuum in the range of 1-100 millitorr to the vacuum housing 20, will maintain the temperature of the second coolant 66 within the vacuum housing 20 within the initial temperature range of about −50 to +35 degrees depending on the millitorr of vacuum applied.

It should be noted that the initial chilling or pre-cooling of the vacuum housing 20 is only used to condense air molecules so that the vacuum cycle can pull the system into a deep vacuum i.e. to about 1-100 millitorr. Without the pre-cooling of the atmosphere within the vacuum housing 20, the vacuum would never achieve the desired deep vacuum of millitorr scale necessary to achieve a desired cooling state of −50 to +35 degree within the vacuum housing. So pre-cooling the atmosphere within the vacuum vessel 20 to anything below ambient will assist the vacuum in pulling more air out in a timely manner. As it does this the atmospheric temperature within the vacuum vessel 20 will drop as vacuum increases without any further assistance from the start-up refrigeration system 98, and the start-up refrigeration unit will shut off as the vacuum reservoir 22 and vacuum pump 24 continue to pull deeper vacuum and thus cooler temperatures, until the desired initial temperature within vacuum housing 20 is achieved. Then the vacuum pump 24 will shut down and will not restart until a preset initial vacuum value is met in the vacuum reservoir 22 based on heat gain within the vacuum housing 20.

Testing the current design has shown that a chamber devoid of air is also devoid of heat and therefore anything inside the chamber is also devoid of heat. Thus, the chilling of the second coolant 66 is believed to be caused by applying 1-100 militorr of vacuum to the vacuum housing 20 containing a glycol based coolant and removing heat laden air from the enclosure and the coolant itself.

The vacuum reservoir 22 disposed between the vacuum pump 24 and the vacuum housing 20 functions as a vacuum reserve which works to initially evacuate the vacuum housing 20 and works to equalize any vacuum lost in the vacuum housing 20 by heat gain, and works as the vacuum source for the vacuum housing 20 so that the vacuum pump 24 only has to run when additional vacuum is needed. Experimentation has shown that a volume of the vacuum reservoir 22 approximately twice that of the vacuum housing 20 is sufficient to account for any variance in heat gain and to supply enough vacuum so that the vacuum pump 24 will only need to run on a passive level and not constantly when the system is running. It is important to note here that this system is able to remove heat while the system is not actually running, and is a large distinction from prior art. Prior art systems are either on or off. In the cooling system 10 of the present invention, when the heat gain to the vacuum reservoir 22 exceeds the vacuum setting, then the vacuum pump 24 turns on and evacuates only the vacuum reservoir 22. The vacuum reservoir 22 keeps the vacuum housing 20 in deep vacuum, and does not need to have the vacuum pump 24 continuously on to do so.

The moisture separator 26 disposed between the vacuum housing 20 and the vacuum reservoir 22 is required because there is a certain amount of moisture in the air present in the housing and the second coolant 66, prior to system startup. Upon the application of vacuum to the vacuum housing 20, any moisture, i.e. water, present in the system flash evaporates upon the application of vacuum. The resulting water vapor needs to be prevented from reaching the vacuum reservoir 22 and, in particular, the vacuum pump 24, to prevent corrosion from occurring over time.

During operation, the coolant pump 30 supplies the first coolant 64 to the inlet of the ev-coil 36 via the coolant supply line 70. Air 100 from a building to be cooled passes through the ev-coil 36 where the air is cooled by convection cooling, i.e. by passing over and through the relatively cooler fins and tubes of the ev-coil 36. The air 100 is drawn through the inlet vent or register 40, (typically equipped with an air filter 42), and expelled through the outlet vent or register 48 by means of the blower assembly 46. The first coolant 64 flowing through the ev-coil 36 absorbs heat as the air 100 passes over and through the fins of the ev-coil 36. The now warmed first coolant 64 exits the ev-coil 36 at an ev-coil outlet and flows to the bypass valve 34 via the coolant return line 78.

If the temperature of the warmed first coolant 64 returning from the ev-coil 36 is above a preset temperature, the first coolant 64 is passed through to the thermo-vessel-coil 12 via the coolant return line 80. In the thermo-vessel-coil 12, the first coolant 64 is chilled to approximately −40 to 20 degrees before again passing through the regulator valve 32 and on through the coolant pump 30 and subsequently through the ev-coil 36.

If the temperature of the warmed first coolant 64 returning from the ev-coil 36 is below a temperature set by the thermostat 50, the bypass valve 34 opens and the regulator valve 32 closes causing the first coolant 64 to flow directly to the coolant pump 30 via the coolant bypass line 86, thereby bypassing the thermo-vessel-coil 12. The bypassed coolant again flows through the coolant pump 30 and subsequently through the ev-coil 36. The bypass valve 34 will continue to control the flow of the first coolant 64 so as to bypass the thermo-vessel-coil 12, until the temperature of the first coolant 64 exceeds the bypass temperature controlled or set by the thermostat 50.

Glycol based coolants are suitable for use with the single phase, low pressure cooling system of the present invention. Lubrication, anti-wear or anti-corrosion agents may also be added to the coolant.

EV-Coil Design

Figure 5:
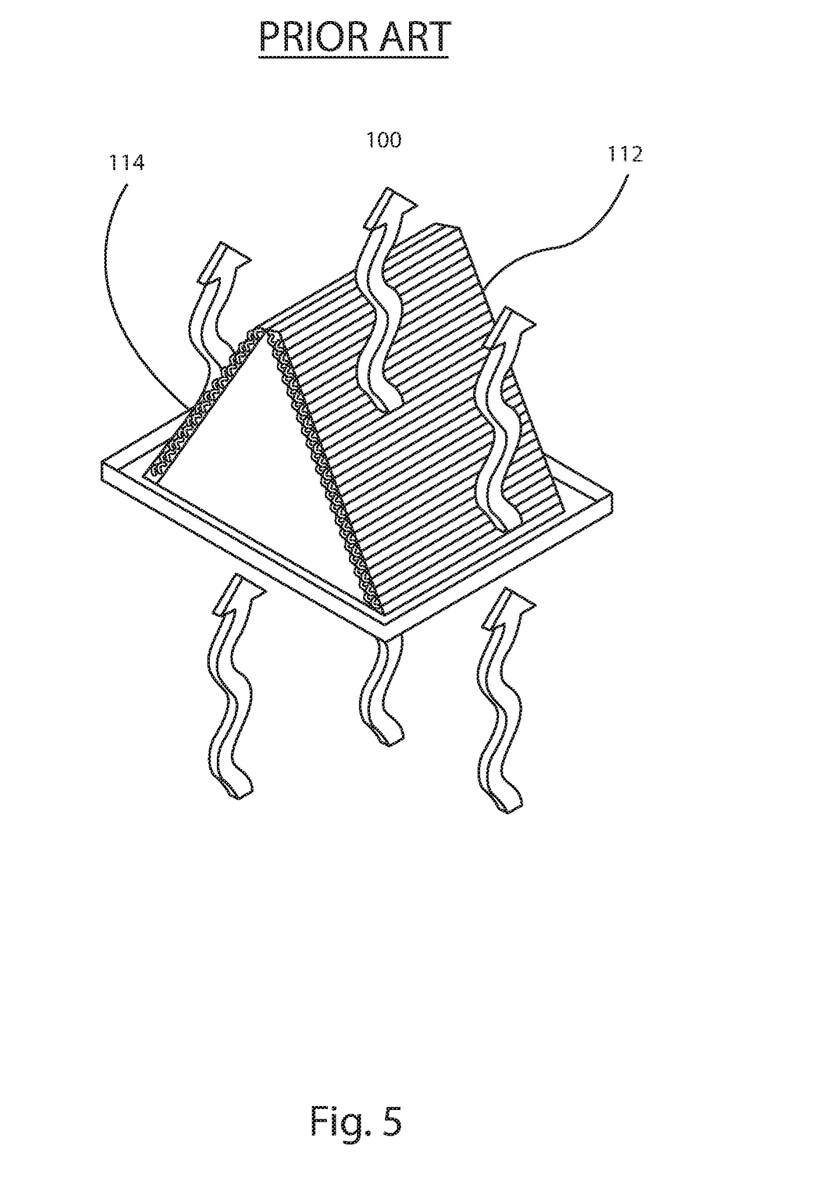
FIG. 5 is a schematic representation of a prior art evaporator.
Figure 6:
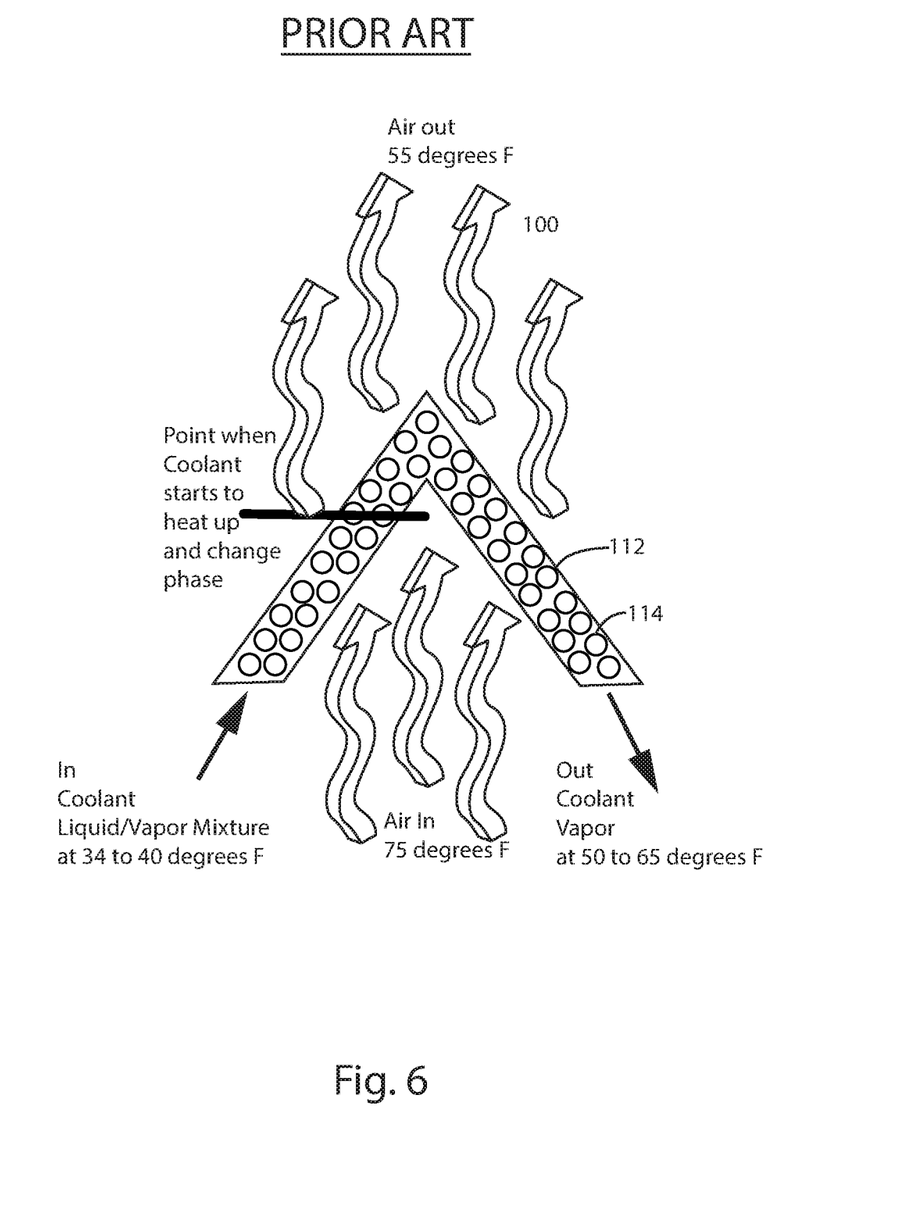
FIG. 6 is another schematic representation of a prior art evaporator.

FIGS. 5-6 show a schematic representation of a conventional prior art evaporator 112. The arrows in FIGS. 5 and 6, indicate air flow. In prior art Freon/compressor type cooling systems, the starting phase of the coolant in the evaporator coils is a liquid/vapor mixture, not a pure liquid. As air flows over the coils, the coolant starts to turn from a liquid/vapor mixture at the coolant inlet to pure vapor as the coils 114 absorb the heat from the air passing over them. As the coolant changes phase to pure vapor, evaporator efficiency decreases as vapor (gas) does not absorb heat as well as a liquid. For this reason, conventional evaporators are able to achieve only about a 20 degree drop in the air temperature as the air flows over the coils.

Typically, less than 50% of the coils will contain coolant in a liquid or liquid-vapor form. The coolant in most of the coils will have phased to a gas. As the coils absorb heat from the air, the coolant temperature continues to rise along the line of the coils. A 15° to 30° difference in the coolant temperature at the evaporator inlet and outlet is typical. The coolant moving through prior art evaporators also usually have a fairly high operating pressure as the system relies on pressure and pressure drops, therefore evaporator coils commonly have a diameter of about ⅜" to ½".

Figure 8:
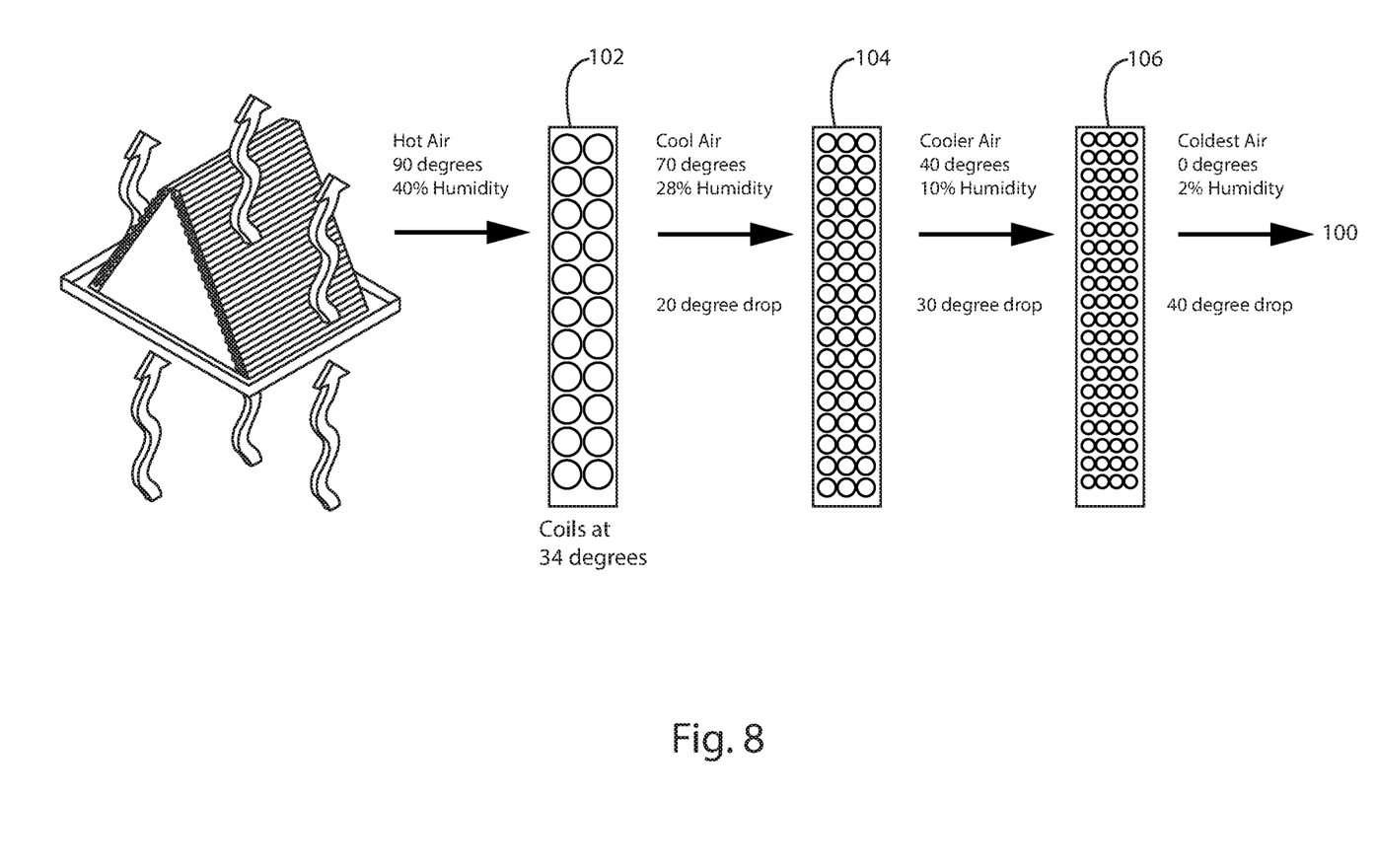
FIG. 8 is a schematic representation of the temperature drop expected to be achievable with a three-core ev-coil configuration in accordance with the present invention.
Figure 9:
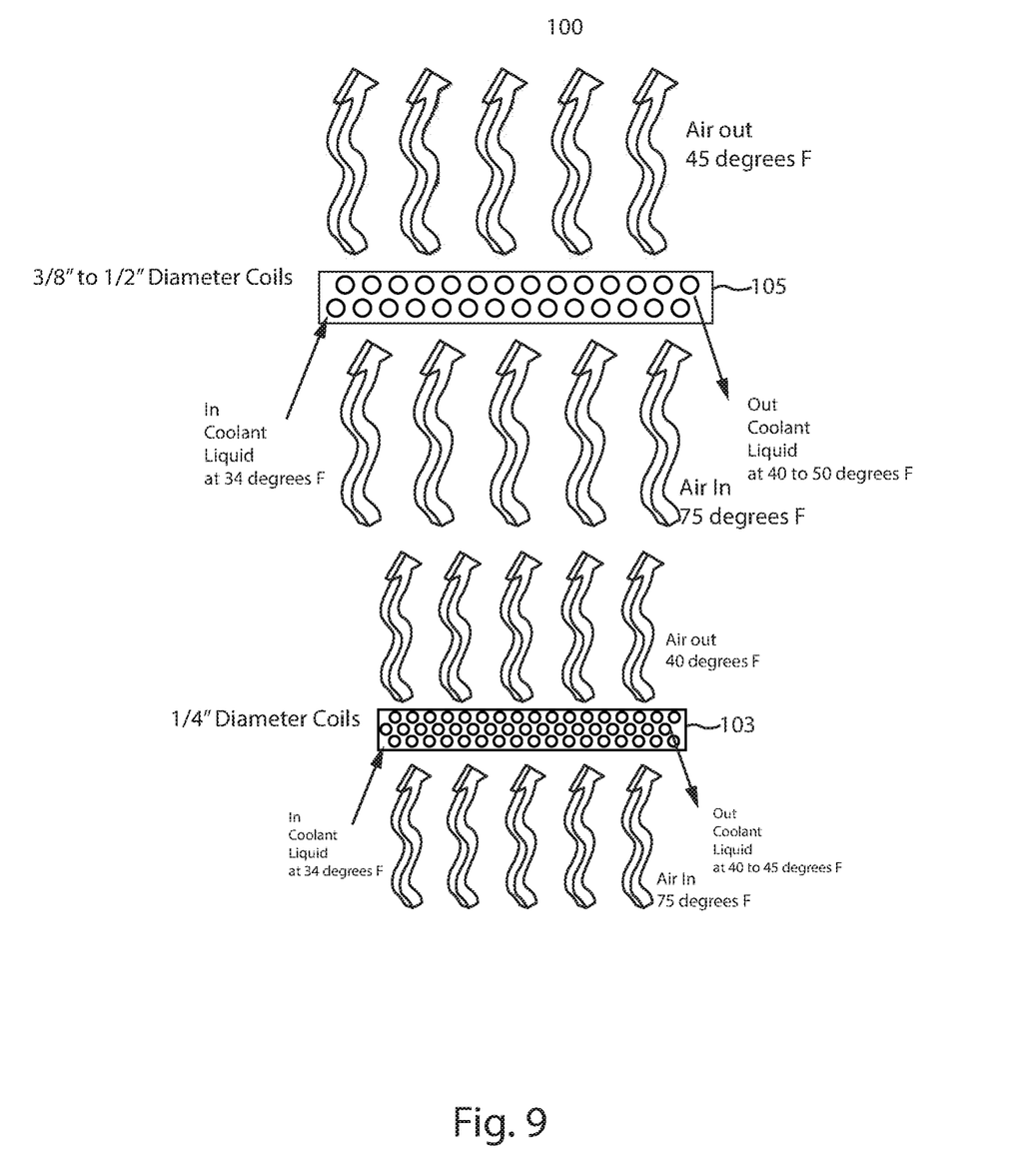
FIG. 9 is a schematic representation of the temperature drop expected to be achievable with particular ev-coil configurations in accordance with the present invention.

FIGS. 8-9 schematically depict a new multi-pass ev-coil 36 containing multiple cores, where each core contains one or more rows of tubes, where the tube diameter decreases from core to core, which is preferred in the cooling system 10 of the present invention. The ev-coil 36 may, however, also be a conventional single pass or single core ev-coil, i.e. one having a single core of tubes of a constant diameter.

Figure 7:
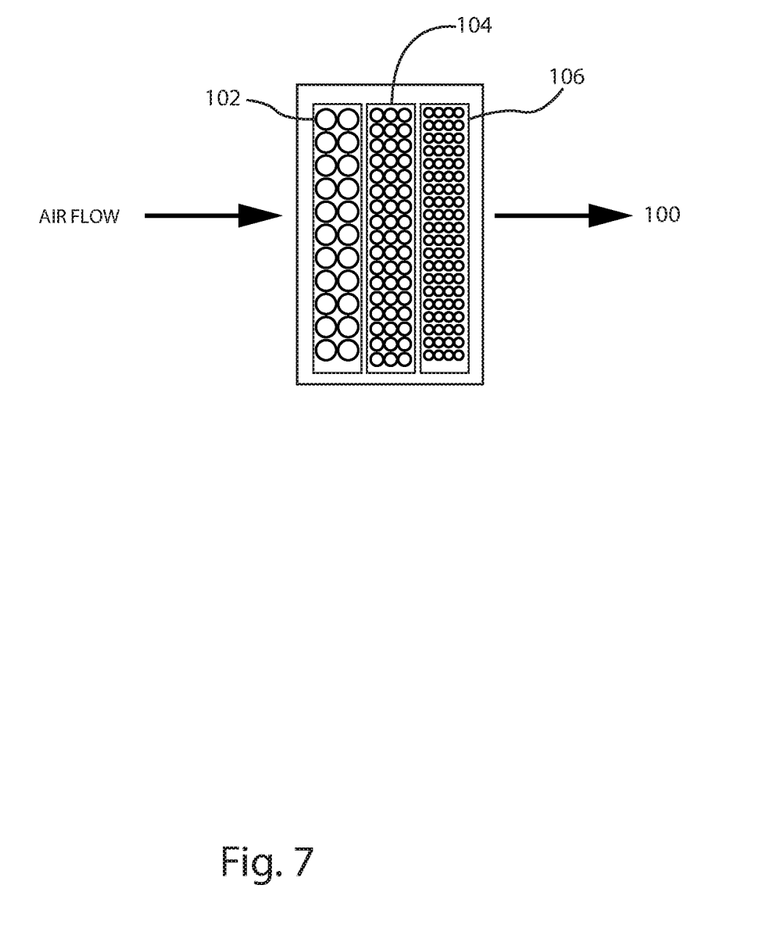
FIG. 7 is a schematic representation of a multi-core, multi-tube ev-coil suitable for use with the single phase, low pressure refrigeration system of the present invention.

FIG. 7 is a schematic representation of the new multi-pass ev-coil design containing first, second and third cores of tubes, i.e. cores 102, 104 and 106, respectively. Coolant flows through each of cores 102, 104 and 106 in series. In this design, each succeeding core of tubes contains tubes of a smaller diameter then the proceeding core. Thus, for example, the tubes of core 104 are of a smaller diameter than those of core 102 and the tubes of core 106 are of a smaller diameter than those of core 104. It is expected that the temperature drop experienced by air passing through the three cores of the ev-coil will increase as the air passes through each core. This design is believed to provide superior cooling to multi-row ev-coils of conventional design which use multiple cores or rows of tubes, where each core or row contains tubes of the same diameter. FIG. 8 shows the expected temperature drops at each of the three cores 102, 104, and 106 of the ev-coil depicted in FIG. 7.

The new ev-coil design presented is more efficient than previous designs because in the cooling system 10 of the present invention, the coolant flowing through the ev-coil tubes is always maintained in a liquid state. That is, no phase change from a liquid to a vapor occurs, as is the case with prior art evaporators. Therefore, as the air flows over the cores of tubes (or coils), the coolant maintains its state as a cold liquid. The continuous cold liquid coolant allows for a greater drop in the temperature of the air passing over the tubes or coils, i.e. more heat absorption occurs. It is expected that air temperature will drop about 30 to 40 degrees, as the air flows over the ev-coil.

Liquid absorbs heat better than either a solid or a vapor (gas). Therefore, in addition to increasing the temperature drop of air passing over or through a bank of tubing, the temperature increase of the coolant in the tubing is decreased over prior art design. The new ev-coil design presented in this disclosure is believed to be more efficient than prior art designs where the coolant changes phase from a liquid to a gas within the evaporator, from a physics point of view. In the single phase, low pressure refrigeration system 10 of the present invention, coolant is always flowing at a temperature that is less than the air temperature flowing through the ev-coil.

Because the present invention cooling system 10 is not dependent on pressure or pressure drops, it has the ability to use ev-coils with a smaller diameter for the tubing or coils than prior art evaporators designed for phase changing coolants. Smaller diameter tubing increases the available surface area, which in turn increases heat absorption of the air flowing over the tubing. This yields a greater drop in air temperature (i.e. more heat absorption), as the air flows over the tubes or coils. It is expected that air temperature drops of 35 to 45 degrees are achievable. Ev-coils using the principles disclosed above, i.e. multiple cores of tubing where each core uses tubing of a smaller diameter than the preceding core may designed in conventional "A-frame" shape allowing installation in pre-existing air register assemblies. FIG. 9 illustrates the concept that a core or row 103 of smaller diameter tubing will produce a greater temperature drop than a core or row 105 of larger diameter tubing, when a liquid coolant is used.

Figure 10:
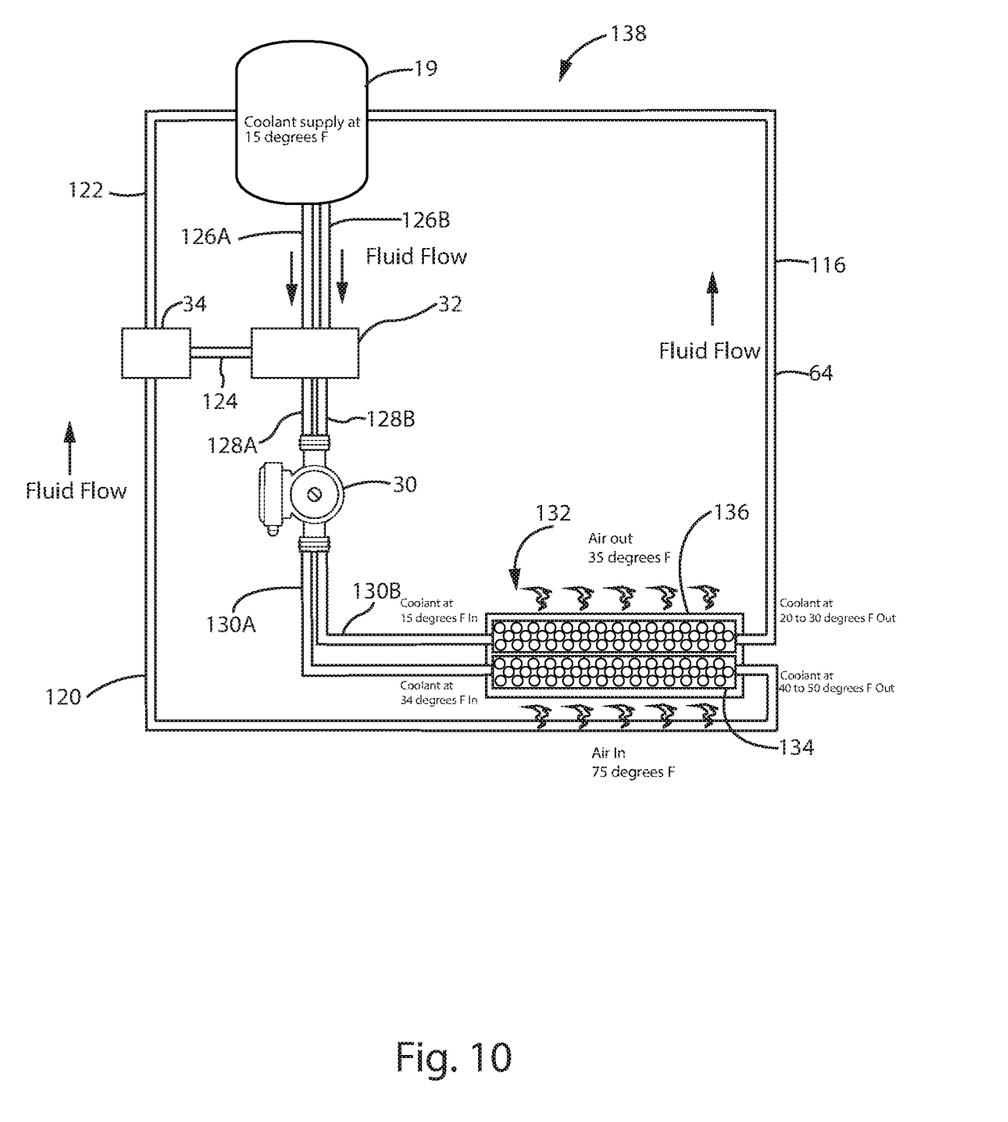
FIG. 10 is a schematic representation of a second embodiment of a fluid circuit suitable for use in the single phase, low pressure refrigeration system of the present invention.

Referring now to FIG. 10, a second embodiment of a fluid circuit 138 of the cooling system 10 of the present invention is presented. This fluid circuit 138 differs from the fluid circuit 18 of the embodiment presented in FIG. 1, principally in that it incorporates a double feed ev-coil 132. The double feed ev-coil 132 includes first and second ev-coil cores 134 and 136, comprised of a series of tubes, where each ev-coil core is independently supplied with the first coolant 64 and where each ev-coil core independently returns warmed second coolant to the chiller 19.

In the fluid circuit 138, the coolant pump 30 supplies the first ev-coil core 132 with cold first coolant 64 via supply line 130A. Subsequently, warmed first coolant 64 from first ev-coil core 132 is returned to the bypass valve 34 via return line 120. From the bypass valve 34, warmed first coolant 64 may be directed to back to the chiller 19 via return line 122 or may be bypassed back to the coolant pump 30 via bypass line 124. The coolant pump 30 provides cold first coolant 64 to the second ev-coil core 136 via a separate supply line 130b. Warmed first coolant 64 exiting the second ev-coil core 136 is returned to the chiller 19 via independent return line 116. In this configuration, warmed first coolant 64 from the second ev-coil core 136 cannot be bypassed back to the coolant pump 30.

The fluid circuit 138 in more detail is as follows. Supply line 126a supplies cold first coolant 64 from the chiller 19 to the regulator valve 32. Supply line 128a supplies cold first coolant 64 from the regulator valve 32 to coolant pump 30. Supply lines 126a and 128a, in conjunction with supply line 130a, feed or supply the first ev-coil core 134 with cold first coolant 64. Similarly, supply line 126b supplies cold first coolant 64 from the chiller 19 to the regulator valve 32. Supply line 128b supplies cold first coolant 64 from the regulator valve 32 to the coolant pump 30. Supply lines 126b and 128b, in conjunction with supply line 130b, feed or supply the second ev-coil core 136.

In the fluid circuit 138, the chiller 19 is configured to supply first coolant 64 at an initial temperature, for example of about 15 degrees. Thus, coolant at the initial temperature is supplied directly to the second ev-coil core 136. After initial startup, first coolant 64 supplied to the first ev-coil core 132 is regulated to be supplied at a second temperature, for example 34 degrees. This arrangement causes a greater air temperature drop across the second ev-coil core 136 than across the first ev-coil core 134. The fluid circuit 138 may be used to provide greater flexibility in controlling the temperature of the air to be cooled.

Figure 11:
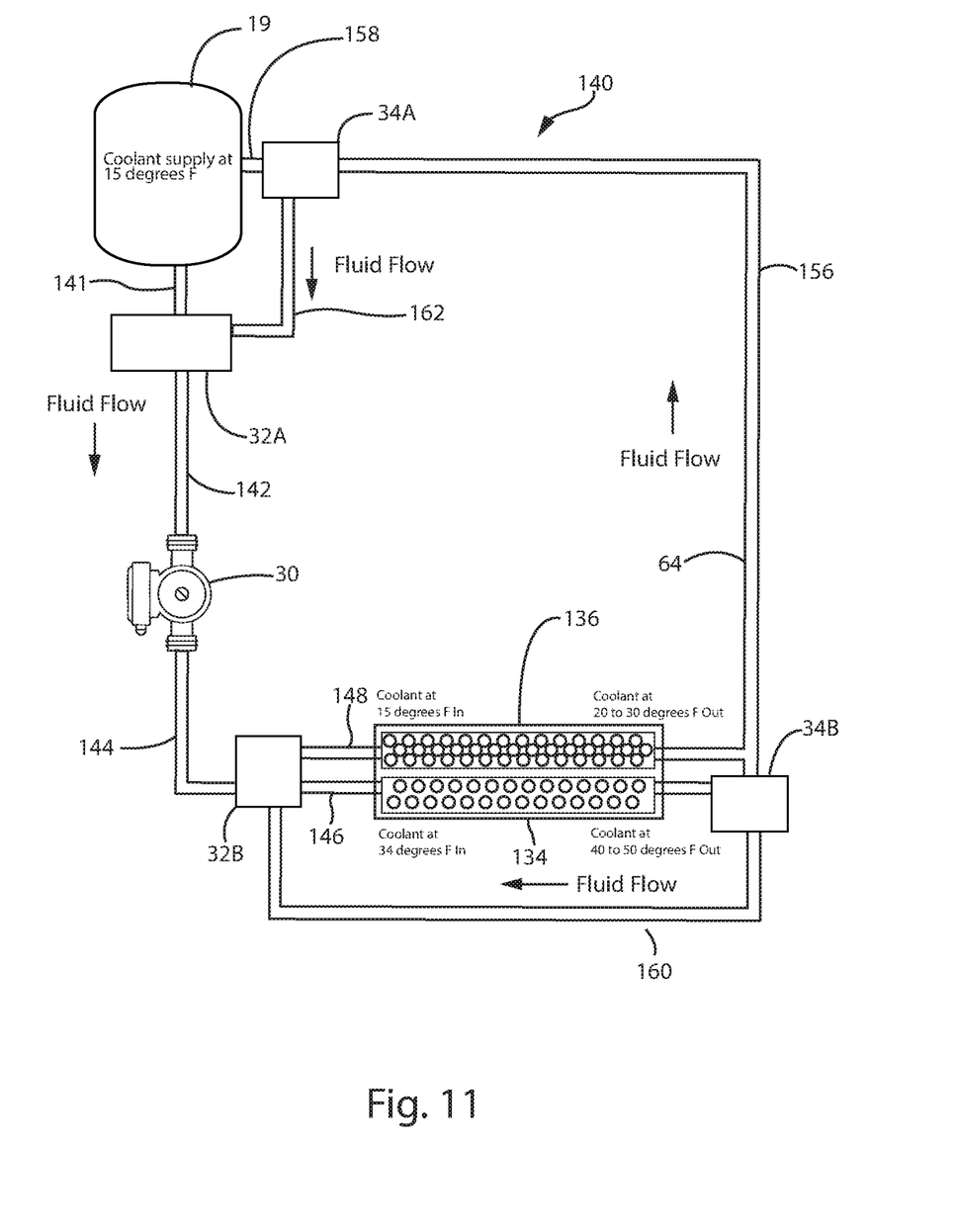
FIG. 11 is a schematic representation of a third embodiment of a fluid circuit suitable for use in the single phase, low pressure refrigeration system of the present invention.

Referring now to FIG. 11, a third embodiment of a fluid circuit 140 of the cooling system 10 of the present invention is presented. Fluid circuit 140 differs from the previously presented fluid circuits in that first coolant 64 from the chiller 19 is initially supplied to both the first ev-coil core 134 and the second ev-coil core 136 at an initial coolant temperature established by the chiller 19. Thereafter, warmed coolant second 64 may be bypassed in the ev-coil 132 at an outlet of the first ev-coil core 134 and returned to inlets of both the first and second ev-coil cores 134 and 136, by a first bypass loop line 160. Both the first and second ev-coil cores 134 and 136 return first coolant 64 to the chiller 19 via a return line 156. At the chiller 19, returned first coolant 64 may again be bypassed and returned to the coolant pump 30, by a second bypass loop line 162.

In more detail, in the fluid circuit 140, the chiller 19 connects to a first regulator valve 32a via supply line 144. Supply line 142 interconnects the first regulator valve 32a with the coolant pump 30. The coolant pump 30 is connected to a second regulator valve 32b via supply line 144. Second regulator valve 32b feeds or supplies an inlet of the first ev-coil core 134 via supply line 146 and an inlet of the second ev-coil core 136 via supply line 148. An outlet of the first ev-coil core 134 is connected to the second bypass valve

34b via return line 150. The second bypass valve 34b connects to second regulator valve 32b via bypass line 152. Second bypass valve 34b connects to first bypass valve 34a via a common return line 156. First bypass valve 34a connects to the chiller 19 via line 158. An outlet of the second ev-coil core 136 connects to the common return line 156 via line 154.

Like fluid circuit 138, fluid circuit 140 allows for the provision of coolant 64 at one temperature to the inlet of the second ev-coil core 136 and at a second warmer temperature (after initial startup) to the inlet of the first ev-coil core 134. Like fluid circuit 138, fluid circuit 140 may also may be used to provide greater flexibility in controlling the temperature of the air to be cooled.

In summary, the single phase, low pressure air conditioning or refrigeration system 10 of the present invention maintains the coolant 66 in the vacuum housing 20 at a desired temperature, by using a vacuum system that evacuates the container of air. Since air is the only type of molecule that can hold heat, when the vacuum housing 20 is devoid of air, it is also devoid of heat and therefore anything inside the vacuum housing 20 is devoid of heat and is thus cooled to a desired level. A vacuum pump 24 is used to evacuate the vacuum reservoir 22 of air, which in turn will evacuate the vacuum housing 20 of air. A conventional refrigeration system is used to initially chill the coolant in the vacuum housing 20 (i.e. the second coolant 66), so that the vacuum housing 20 can achieve a state of deep vacuum.

The entire system can continuously keep the vacuum vessel at a desired temperature by running the vacuum pump minimally. Therefore, the entire cooling system 10 can remain always on. Also, since the first and second coolants 64 and 66 does not contain Freon, Freon contamination is eliminated, which in turn eliminates acid build up, corrosion, and motor winding delamination within the entire closed loop system. The cooling system 10 of the present invention also eliminates the inefficient design and of present AC systems which require a compressor and expansion valve and which are required to cause a refrigerant such as Freon to transition from a cold liquid to a hot gas and back to a cold liquid. It is believed that even if the system of the present invention were to be run continuously, dramatic electrical savings would be attained in comparison to a conventional cooling system.

While the present invention has been described with regards to particular embodiments, it is recognized that additional variations of the present invention may be devised without departing from the inventive concept.

The invention claimed is:

1. A fluid chiller comprising:
   a tubular coil having a fluid inlet and a fluid outlet, the tubular coil enclosed within a vacuum housing, wherein the fluid inlet and the fluid outlet extend from the vacuum housing;
   the vacuum housing being partially filled with a coolant and the remaining volume filled by an atmosphere; the vacuum housing connected to a vacuum source for applying a vacuum to the vacuum housing; and
   a refrigeration system at least partially surrounding the vacuum housing for chilling the vacuum housing and the atmosphere and coolant within the vacuum housing to an initial temperature prior to applying a vacuum to the vacuum housing; and
   wherein, a fluid having a temperature warmer than the initial temperature is cooled while flowing from the fluid inlet to the fluid outlet of the tubular coil.

2. The fluid chiller of claim 1, wherein the vacuum source applies vacuum within a range of 1 to 100 millitor to the vacuum housing.

3. The fluid chiller of claim 1, wherein the initial temperature of the coolant is maintained within a range of −40 to 20 degrees Fahrenheit at an applied vacuum of 1 to 100 millitor.

4. The fluid chiller of claim 1, wherein the vacuum source is a vacuum pump.

5. The fluid chiller of claim 4, wherein the vacuum pump is connected in series with a vacuum reservoir.

6. The fluid chiller of claim 5, further comprising a moisture separator disposed on a vacuum supply line between the vacuum housing and the vacuum source for collecting moisture drawn from the vacuum housing, wherein the moisture collected in the moisture separator is prevented from entering the vacuum reservoir.

7. The fluid chiller of claim 6, wherein a moisture return line extends from the moisture separator to the vacuum housing for returning moisture collected in the moisture separator to the vacuum housing.

8. The fluid chiller as in claim 1 wherein a vacuum supply line is connected between the vacuum source and the vacuum housing and a regulator valve is connected to the vacuum supply line for selectively connecting the vacuum housing to the vacuum source.

9. The fluid chiller as in claim 8 further comprising a moisture separator disposed on the vacuum supply line between the regulator valve and the vacuum source for collecting moisture drawn from the vacuum housing when the regulator valve is selectively opened, wherein the moisture collected in the moisture separator is prevented from entering the vacuum reservoir.

10. A fluid chiller comprising:
    an internal coil having a fluid inlet and a fluid outlet, the internal coil enclosed within a vacuum housing, wherein the fluid inlet and the fluid outlet extend from the vacuum housing;
    the vacuum housing being partially filled with a coolant and the remaining volume filled by an atmosphere; the vacuum housing connected to a vacuum source for applying a vacuum to the vacuum housing; and
    a refrigeration system for chilling the vacuum housing and the atmosphere and coolant within the vacuum housing to an initial temperature prior to applying a vacuum to the vacuum housing; wherein the refrigeration system includes an external cooling coil disposed about a periphery of the vacuum housing; and
    wherein, a fluid having a temperature warmer than the initial temperature is cooled while flowing from the fluid inlet to the fluid outlet of the internal coil.

11. The fluid chiller of claim 10, wherein the cooling coil and vacuum housing are surrounded by insulation.

12. A fluid chiller comprising:
    an internal tubular coil having a fluid inlet and a fluid outlet, the internal tubular coil enclosed within a vacuum housing, wherein the fluid inlet and the fluid outlet extend from the vacuum housing;
    the vacuum housing being partially filled with a first coolant and the remaining volume filled by an atmosphere; the vacuum housing connected to a vacuum source for applying a vacuum to the vacuum housing; and
    an external cooling coil disposed about a periphery of the vacuum housing for chilling the vacuum housing and the atmosphere and the first coolant within the vacuum housing to an initial temperature prior to applying a vacuum to the vacuum housing;

a vacuum supply line connected between the vacuum source and the vacuum housing with a regulator valve connected to the vacuum supply line for selectively connecting the vacuum housing to the vacuum source; and wherein, a fluid having a temperature warmer than the initial temperature is cooled while flowing from the fluid inlet to the fluid outlet of the internal tubular coil.

13. The fluid chiller of claim 12, wherein the vacuum source applies vacuum within a range of 1 to 100 millitor to the vacuum housing.

14. The fluid chiller of claim 12, wherein the initial temperature of the first coolant is maintained within a range of −40 to 20 degrees Fahrenheit at an applied vacuum of 1 to 100 millitor.

15. The fluid chiller of claim 12, wherein the vacuum source is a vacuum pump.

16. The fluid chiller of claim 15, wherein the vacuum pump is connected in series with a vacuum reservoir.

17. The fluid chiller as in claim 12 wherein a vacuum supply line is connected between the vacuum source and the vacuum housing and a regulator valve is connected to the vacuum supply line for selectively connecting the vacuum housing to the vacuum source.

18. The fluid chiller as in claim 17 further comprising a moisture separator disposed on the vacuum supply line between the regulator valve and the vacuum source for collecting moisture drawn from the vacuum housing when the regulator valve is selectively opened, wherein the moisture collected in the moisture separator is prevented from entering the vacuum reservoir.

19. The fluid chiller of claim 18, wherein a moisture return line extends from the moisture separator to the vacuum housing for returning moisture collected in the moisture separator to the vacuum housing.

20. A fluid chiller comprising:

a fluid circuit including a thermo-vessel-coil, a pump, and an evaporator-coil, connected in series, wherein a first coolant is supplied by the thermo-vessel-coil to the pump and by the pump to the evaporator-coil, and wherein the coolant is returned from the evaporator-coil to the thermo-vessel-coil;

the fluid circuit further including a bypass valve, the bypass valve being responsive to a signal from a thermostat and selectively operable to direct the first coolant returning from the evaporator-coil to either the thermo-vessel-coil or the pump;

wherein the thermo-vessel-coil is enclosed within a vacuum housing, the vacuum housing containing a second coolant and an atmosphere wherein the thermo-vessel-coil is disposed within the second coolant;

a vacuum source for applying vacuum to the vacuum housing, the vacuum source including a vacuum pump connected in series to a vacuum reservoir;

wherein a moisture separator for preventing moisture from entering the vacuum reservoir is connected between the vacuum housing and the vacuum reservoir;

a tubular coil having a fluid inlet and a fluid outlet, the tubular coil enclosed within a vacuum housing, wherein the fluid inlet and the fluid outlet extend from the vacuum housing;

a refrigeration system operatively connected to the vacuum housing for cooling the vacuum housing and the atmosphere and coolant within the vacuum housing to an initial temperature prior to applying a vacuum to the vacuum housing; and wherein, a fluid having a temperature warmer than the initial temperature is cooled while flowing from the fluid inlet to the fluid outlet of the tubular coil.

21. The fluid chiller as in claim 20 wherein a vacuum supply line is connected between the vacuum source and the vacuum housing and a regulator valve is connected to the vacuum supply line for selectively connecting the vacuum housing to the vacuum source.

22. The fluid chiller of claim 20, wherein the refrigeration system includes a tubular cooling coil disposed about a periphery of the vacuum housing.

* * * * *